N. Chapin,
Cider Press.
Nº 8,339.          Patented Sep. 2, 1851.
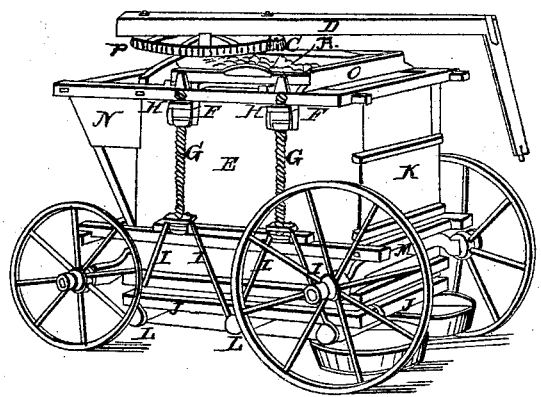
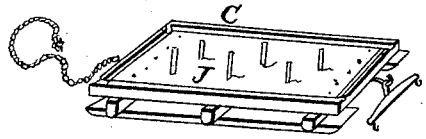
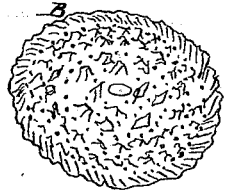
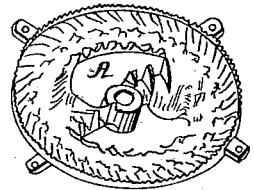

UNITED STATES PATENT OFFICE.

NATHAN CHAPIN, OF SYRACUSE, NEW YORK.

CIDER-MILL.

Specification of Letters Patent No. 8,339, dated September 2, 1851.

*To all whom it may concern:*

Be it known that I, NATHAN CHAPIN, of the city of Syracuse, in the county of Onondaga and State of New York, have invented a new and useful Improvement in Cider-Mills; and I do hereby declare the following to be a full, clear, and exact description of the same, reference being had to the annexed drawing, making part of this specification, in which—

Figure 1, is a perspective view of the whole machine. Fig. 2, is a view of the upper plate of the grinder. Fig. 3, is a view of the under plate of the grinder. Fig. 4, represents the platform of the press.

Similar letters in each figure refer to corresponding parts.

The nature of my invention consists in a new method of grinding apples, together with the method of removing the platform of the press for the purpose of disposing of the pumice after it has been pressed.

Construct a strong framework surrounding and sustaining the crib (E),—the crib, being made of grates or slats standing upright, is about three feet by five horizontally and four feet in height, for a large mill. At each end of the framework attach an axletree (M) for the purpose of attaching thereto a common set of wagon wheels. To the upper part of the frame attach a hopper (O). Make a grinder consisting of an upper and lower plate (A) and (B), both of cast iron, and having their inner surfaces thickly bestuded with triangular teeth set in circles, and the lower plate (B) perforated with numerous circles of holes occupying the spaces between the circles of teeth, the center of the plates being the center of the circles. The upper plate (A) is made stationary. The lower plate (B) is attached to a shaft having a pinion (C) upon its upper end, which meshes into the spur wheel (P) to which is attached the sweep (D). Make two press beams passing through the crib from one side to the other, having iron tenons projecting through the slots at (H H) to receive the nuts (F F). Two screws (G G) are placed upon each side of the crib, working through the nuts (F F), and having their lower ends attached to the stirrups (I I) which suspend the platform (J J). This platform is made of three cross timbers upon which is laid two inch plank in size equal to the frame of the crib, and having a groove upon its upper surface near the margin. Two narrow plank are attached to the under surface of the crossbars (L, L, L,) to serve as runners when the platform is dropped upon the ground.

The operation of my invention is as follows: By attaching a horse to the end of the sweep (D) the spur wheel, pinion, and the lower plate of the grinder are set in motion. Apples being placed in the hopper pass down through the large openings in the plate (A) and are crushed by the triangular teeth. The circles of teeth on the upper plates pass between the circles of teeth, and over the perforations of the lower plate (B), and a portion of the pumice is forced through the perforations in the lower plate, and the remainder of the pumice is forced between the rubbing surfaces and out at the periphery of the plates, dropping into the crib below. When the crib is filled with pumice place pieces of plank over it, and under the cross beams, so that by turning the screws the beams and planks are forced downward causing the cider to issue through the grates on all sides of the crib, and running along the grooves on the platform is discharged into tubs. When the pressing is finished, the tubs and rear gate (K) are removed, and the cheese is removed from the crib by detaching the stirrups from the ends of the cross beams (L L L) when the platform and cheese fall upon the ground and may be drawn out under the rear axletree by a horse.

What I claim as my invention and desire to secure by Letters Patent is—

1. The cast iron grinders arranged and constructed as described, viz. so as to force the apples while being crushed from the center toward the periphery of the plates, and at the same time to force a portion of the pumice through the holes in the lower plate of the grinders.

2. I also claim the method of removing the cheese of pumice from the press crib, viz. by detaching the platform from the press crib and using the same for a sled to draw the cheese from the mill substantially as described.

NATHAN CHAPIN.

Witnesses:
I. P. BENTLEY,
J. R. ANDERSON.